United States Patent
Zhang et al.

(10) Patent No.: US 12,477,048 B2
(45) Date of Patent: Nov. 18, 2025

(54) METHOD, DEVICE AND COMPUTER PROGRAM PRODUCT FOR TRANSMITTING DATA BLOCK

(71) Applicant: Dell Products L. P., Round Rock, TX (US)

(72) Inventors: Weibing Zhang, Beijing (CN); Victor Lei Gao, Beijing (CN); Hao Fang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/587,039

(22) Filed: Feb. 26, 2024

(65) Prior Publication Data
US 2025/0063107 A1    Feb. 20, 2025

(30) Foreign Application Priority Data
Aug. 18, 2023    (CN) .......................... 202311051374.1

(51) Int. Cl.
| | |
|---|---|
| G06F 15/16 | (2006.01) |
| G06F 9/54 | (2006.01) |
| H03M 7/30 | (2006.01) |
| H04L 29/06 | (2006.01) |
| H04L 69/04 | (2022.01) |

(52) U.S. Cl.
CPC ........... H04L 69/04 (2013.01); H03M 7/6011 (2013.01)

(58) Field of Classification Search
CPC ....... H04L 69/04; H04L 67/06; H03M 7/6011
USPC .................................................... 726/23
See application file for complete search history.

(56) References Cited

U.S. PATENT DOCUMENTS

| | | | |
|---|---|---|---|
| 7,599,371 B1 * | 10/2009 | Brainos ................. | H04L 69/04 370/477 |
| 8,468,244 B2 | 6/2013 | Redlich et al. | |
| 8,798,070 B2 * | 8/2014 | Chun .................... | H04L 69/22 370/474 |
| 9,628,810 B1 | 4/2017 | Bingol et al. | |
| 10,638,353 B2 * | 4/2020 | Ahmadzadeh ...... | H04W 28/065 |
| 11,368,167 B2 * | 6/2022 | Chuggani ............ | H03M 7/607 |
| 11,567,872 B1 * | 1/2023 | Pillai .................. | G06F 12/0862 |
| 11,687,236 B2 * | 6/2023 | Wang .................. | G06F 12/0873 711/154 |
| 2004/0107298 A1 * | 6/2004 | Westphal ............ | H04L 9/40 709/236 |
| 2004/0165527 A1 * | 8/2004 | Gu ...................... | H04L 65/1101 370/229 |
| 2006/0259949 A1 | 11/2006 | Schaefer et al. | |

(Continued)

*Primary Examiner* — Hamza N Algibhah
(74) *Attorney, Agent, or Firm* — BainwoodHuang

(57) ABSTRACT

Techniques for transmitting a data block involve receiving, from a client, a request for reading the data block. Such techniques further involve determining, at a data block layer, whether the data block needs to be compressed at a protocol layer based on a flag indicating whether the data block has been compressed and a storage size of the data block. Such techniques further involve transferring, in response to determining that the data block does not need to be compressed at the protocol layer, an indication that the data block does not need to be compressed at the protocol layer from the data block layer to the protocol layer. Such techniques further involve sending the data block to the client through the protocol layer without compressing the data block at the protocol layer.

20 Claims, 10 Drawing Sheets

(56) References Cited

U.S. PATENT DOCUMENTS

| | | | |
|---|---|---|---|
| 2008/0034119 A1* | 2/2008 | Verzunov | H04L 69/326 |
| | | | 709/247 |
| 2008/0046616 A1* | 2/2008 | Verzunov | H04W 28/06 |
| | | | 710/68 |
| 2010/0241694 A1* | 9/2010 | Jensen | H04L 67/1095 |
| | | | 709/203 |
| 2011/0228799 A1* | 9/2011 | Chun | H04W 28/06 |
| | | | 370/476 |
| 2016/0142932 A1* | 5/2016 | Ahmadzadeh | H04W 28/0236 |
| | | | 370/328 |
| 2016/0234343 A1 | 8/2016 | Fausak et al. | |
| 2016/0371190 A1* | 12/2016 | Romanovskiy | G06F 3/0659 |
| 2017/0085622 A1* | 3/2017 | Gopinath | H04L 67/1001 |
| 2018/0077068 A1* | 3/2018 | Dhanabalan | H04L 69/04 |
| 2019/0154439 A1 | 5/2019 | Binder | |
| 2020/0137628 A1* | 4/2020 | Kandasamy | H04L 67/5651 |
| 2021/0344549 A1* | 11/2021 | Babington | H03M 7/6082 |
| 2021/0409037 A1* | 12/2021 | Chuggani | H03M 7/6011 |
| 2022/0171555 A1* | 6/2022 | Ponnuswamy | H04L 67/1097 |
| 2022/0269407 A1* | 8/2022 | Wang | G06F 3/0608 |
| 2024/0063813 A1* | 2/2024 | Li | H03M 7/3079 |
| 2024/0275557 A1* | 8/2024 | Vitthaladevuni | H04L 1/003 |
| 2024/0354013 A1 | 10/2024 | Zhang et al. | |

* cited by examiner

METHOD, DEVICE AND COMPUTER PROGRAM PRODUCT FOR TRANSMITTING DATA BLOCK

CROSS-REFERENCE TO RELATED APPLICATION

This application claims priority to Chinese Patent Application No. CN202311051374.1, on file at the China National Intellectual Property Administration (CNIPA), having a filing date of Aug. 18, 2023, and having "METHOD, DEVICE AND COMPUTER PROGRAM PRODUCT FOR TRANSMITTING DATA BLOCK" as a title, the contents and teachings of which are herein incorporated by reference in their entirety.

TECHNICAL FIELD

The present disclosure relates to the field of data storage and, more specifically, to a method, a device, and a computer program product for transmitting a data block.

BACKGROUND

Protocol layer compression involves compressing a file at the protocol layer of a server or a client before sending the file, then sending the compressed file over a network, and then decompressing the compressed file at the server or client that receives the compressed file. A variety of file sharing protocols support protocol layer compression, and in this way, the amount of data transmitted over the network can be reduced, which helps to reduce the data transmission time and improve the actual data transmission throughput when the data transmission is subjected to limitation by the network bandwidth.

SUMMARY OF THE INVENTION

Embodiments of the present disclosure provide a method, a device, and a computer program product for transmitting a data block. In embodiments of the present disclosure, a server receives a request from a client for reading a data block. The server may then acquire compression information associated with the data block at the data block layer. The compression information may include a flag indicating whether the data block was compressed before being stored, and the amount of disk space the data block actually occupies in the storage system. Based on this compression information, the server may determine whether the data block needs to be compressed at the protocol layer. If this data block does not need to be compressed at the protocol layer, the indication of not needing compression is transferred from the data block layer to the protocol layer, where the uncompressed data block is then sent directly to the client without further compression. This allows for less compression of data blocks with poor compressibility at the protocol layer, and compression of these data blocks with poor compressibility results in a small reduction in the amount of data transmitted and a small reduction in transmission time while increasing the consumption of processor and memory resources. Therefore, in this way, by transferring the compressibility information for data blocks from the data block layer to the protocol layer, the protocol layer can be enabled to perform appropriate operation processes for different data blocks, so that compression and decompression operations for data blocks with poor compressibility can be reduced, thus saving processor and memory resources. In addition to this, since this approach reduces the number of compression and decompression operations, thereby saving the time consumed in performing the compression and decompression operations, the overall response time can be reduced.

In a first aspect of embodiments of the present disclosure, a method for transmitting a data block is provided. The method includes: receiving a request from a client for reading the data block. The method further includes: determining, at a data block layer, whether the data block needs to be compressed at a protocol layer based on a flag indicating whether the data block has been compressed and a storage size of the data block. The method further includes: transferring, in response to determining that the data block does not need to be compressed at the protocol layer, an indication that the data block does not need to be compressed at the protocol layer from the data block layer to the protocol layer. In addition, the method further includes: sending the data block to the client through the protocol layer without compressing the data block at the protocol layer.

In a second aspect of the embodiments of the present disclosure, an electronic device is provided. The electronic device includes one or more processors; and a storage apparatus for storing one or more programs, wherein the one or more programs, when executed by the one or more processors, cause the one or more processors to implement a method for transmitting a data block. The method includes: receiving a request from a client for reading the data block. The method further includes: determining, at a data block layer, whether the data block needs to be compressed at a protocol layer based on a flag indicating whether the data block has been compressed and a storage size of the data block. The method further includes: transferring, in response to determining that the data block does not need to be compressed at the protocol layer, an indication that the data block does not need to be compressed at the protocol layer from the data block layer to the protocol layer. In addition, the method further includes: sending the data block to the client through the protocol layer without compressing the data block at the protocol layer.

In a third aspect of embodiments of the present disclosure, a computer program product is provided. The computer program product is tangibly stored on a non-volatile computer-readable medium and includes machine-executable instructions, wherein the machine-executable instructions, when executed, cause a machine to implement a method for transmitting a data block. The method includes: receiving a request from a client for reading the data block. The method further includes: determining, at a data block layer, whether the data block needs to be compressed at a protocol layer based on a flag indicating whether the data block has been compressed and a storage size of the data block. The method further includes: transferring, in response to determining that the data block does not need to be compressed at the protocol layer, an indication that the data block does not need to be compressed at the protocol layer from the data block layer to the protocol layer. In addition, the method further includes: sending the data block to the client through the protocol layer without compressing the data block at the protocol layer.

It should be understood that the content described in the Summary of the Invention part is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, the same or similar accompanying numerals indicate the same or similar elements, wherein.

DETAILED DESCRIPTION

Figure 1:
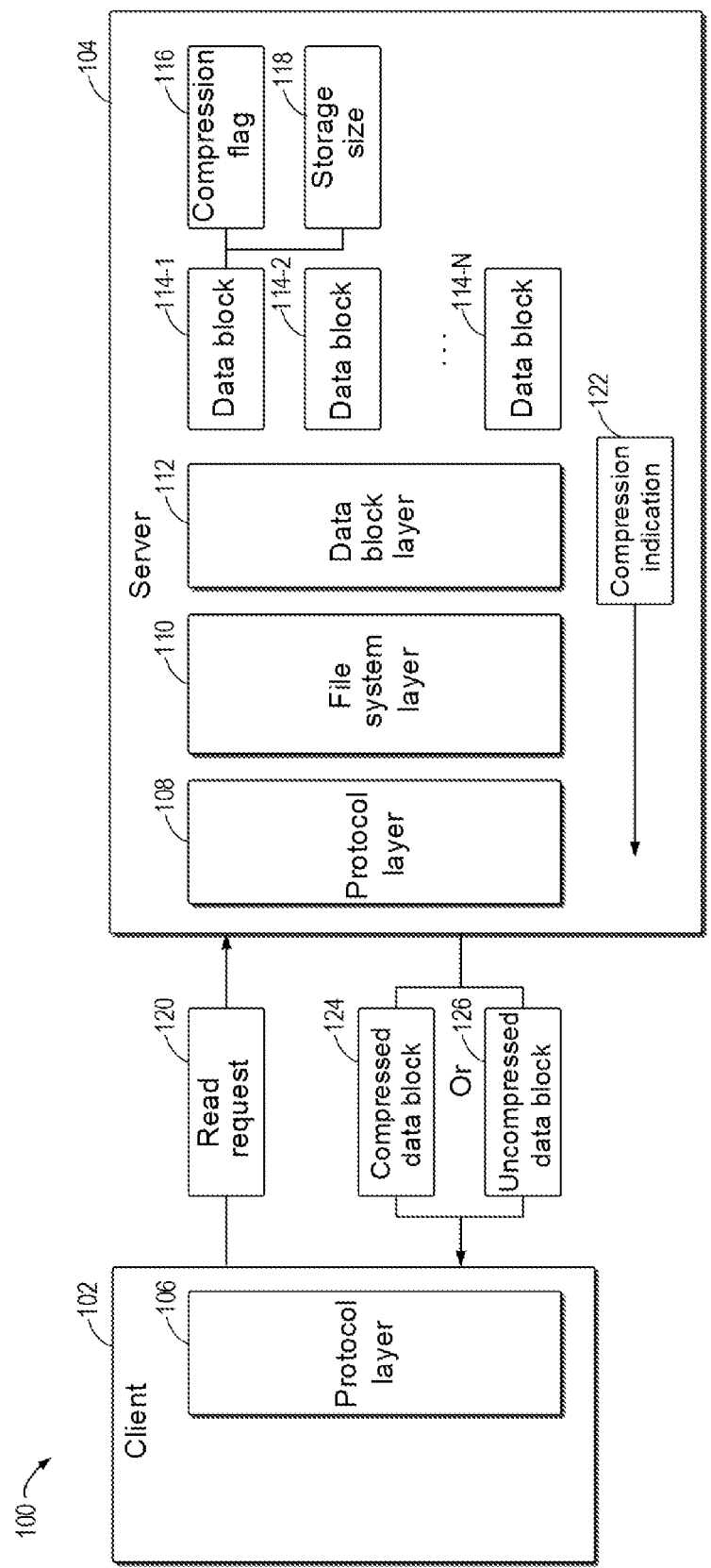
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The following will describe the embodiments of the present disclosure in more detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, protocol layer compression involves compressing a file at the protocol layer of a server or client before sending the file, then sending the compressed file over a network, and then decompressing the compressed file at the server or client that receives the compressed file. In this way, the amount of data transmitted over the network can be reduced, which helps to reduce the data transmission time and improve the actual data transmission throughput when the data transmission is subjected to limitation by the network bandwidth. However, since this approach consumes processor resources as it needs to perform compression and decompression operations on the client and the server, respectively, how to improve the efficiency of data transmission while reducing unnecessary consumption of processor resources is an issue that needs to be addressed.

The file transfer protocol (FTP), the secure file transfer protocol (SFTP), and the server message block (SMB) protocol all support protocol layer compression with connection-level compression, wherein these protocols automatically negotiate compression/decompression protocols between a server and a client, and then reduce the size of data transferred over the connection. The FTP uses a "COMpress" subcommand to enable the compressed-data transmission mode. The SFTP uses the "compression (-C)" switch to enable the connection-level compression. SMB compression can enable the protocol layer compression through configurations of the client and the server.

An illustration is given below using the SMB protocol as an example, where the SMB compression allows the client to request the file to be compressed before sending it over the network. When the storage server is capable of SMB compression, it can accept the request and transmit the compressed data. If the SMB compression is not enabled or the client chooses not to use the SMB compression, normal I/O requests that do not perform compression operations will continue. Compressing the file can save the amount of data transmitted over the network, and the higher the compression ratio, the more amount of data is saved, the less bandwidth is consumed, and the less transmission time is consumed.

However, for high-entropy data streams (i.e., data streams that have a large amount of information in the data and have no apparent regularity or pattern), the compression thereof provides very little help, as only a small amount of space can be saved by compression computation. In some conventional solutions, SMB compression sampling is introduced to minimize the impact, and the SMB compression sampling attempts to compress the first 524,288,000 bytes (500 MiB) of the file during transmission, and if the size of the space that can be saved by compression in that 500 MiB is less than 104,857,600 bytes (100 MiB), SMB compression will stop trying to compress the rest part of the file. If at least 100 MiB is saved in the first 500 MiB, the SMB compression will continue to compress the rest part of the file. However, the result of this compression sampling is not accurate, as it is possible that a small amount of data can be compressed in the first 500 MiB, but a large amount of data can be compressed in the rest part.

In some other conventional solutions, when the client or the server requests reading of a file, the SMB always attempts to compress the entire file, which means that when the client or the server requests reading of the file, compression is always performed on all data blocks. This means that for data blocks with poor compressibility (i.e., those with small differences between the pre-compression size and the post-compression size), processor and memory resources are wasted on unnecessary compression attempts. In addition, the time spent on these compression attempts also results in a longer response time.

To this end, embodiments of the present disclosure present a solution for concurrently transmitting data. In embodiments of the present disclosure, a server receives a request from a client for reading a data block. The server may then acquire compression information associated with the data block at the data block layer. The compression information may include a flag indicating whether the data block was compressed before being stored, and the amount of disk space the data block actually occupies in the storage system. Based on this compression information, the server may determine whether the data block needs to be compressed at the protocol layer. If this data block does not need to be compressed at the protocol layer, the indication of not needing compression is transferred from the data block layer to the protocol layer, where the uncompressed data block is then sent directly to the client without further compression.

In this way, by transferring the compressibility information for data blocks from the data block layer to the protocol layer, the protocol layer can be enabled to perform appropriate operation processes for different data blocks, so that compression and decompression operations for data blocks with poor compressibility can be reduced, thus saving processor and memory resources. In addition to this, since this approach reduces the number of compression and decompression operations, thereby saving the time consumed in performing the compression and decompression operations, the overall response time can be reduced.

FIG. 1 illustrates a schematic diagram of an example environment 100 in which a plurality of embodiments of the present disclosure can be implemented. As shown in FIG. 1, a client 102 and a server 104 are included in the environment 100, wherein the client 102 includes a protocol layer 106, and the server 104 includes a protocol layer 108, a file system layer 110, and a data block layer 112 and stores data blocks 114-1, 114-2, . . . , 114-N (collectively referred to as data blocks 114). At the protocol layer 106 of the client 102 and the protocol layer 108 of the server 104, the transmission of data in the network, the compression of the data blocks prior to transmission, and the decompression of the compressed data blocks after they are received can be realized. At the file system layer 110 of the server 104, the organization, storage, and access of files and directories can be managed. At the data block layer 112 of the server 104, actual storage and read/write support of data may be provided to the file system layer 110.

In the environment 100 shown in FIG. 1, the data block 114-1 stored in the server 104 may be a data block that has been compressed or may be an uncompressed original data block, and a compression flag 116 indicative of whether the data block 114-1 has been compressed is stored in the server 104. In some embodiments, a value of "1" for the compression flag 116 may indicate that the stored data block 114-1 is a data block that has been compressed, and a value of "0" for the compression flag 116 may indicate that the stored data block 114-1 is an original data block that has not been compressed. In addition to this, a storage size 118 of the data block 114-1 is also stored in the server 104. Depending on the settings of the storage system, the data block 114 has a set size when it has not been compressed, e.g., 8 KB. If the stored data block 114 is an original data block, the storage size 118 is 8 KB; and if the stored data block 114 is a compressed data block, the storage size 118 may be, for example, 4 KB. It should be understood that for brevity, only the compression flag 116 and the storage size 118 corresponding to the data block 114-1 are shown in the environment 10 shown in FIG. 1; however, the server 104 may acquire a compression flag and a storage size corresponding to each of the data blocks 114.

As shown in FIG. 1, the client 102 may send a read request 120 to the server 104 for reading a data block. For example, the read request 120 may request reading of the data block 114-1. The server 104 may then generate a compression indication 122 at the data block layer 112, wherein the compression indication 122 indicates whether or not the data block 114-1 needs to be compressed at the protocol layer 108 before being transmitted to the client 102. At the protocol layer 108, if the compression indication 122 indicates that the data block 114-1 does not need to be compressed, the server 104 transmits an uncompressed data block 126 (i.e., the data block 114-1 that is not compressed) directly to the client 102; and if the compression indication 122 indicates that the data block 114-1 needs to be compressed, before transmitting the data block 114-1, the server 104 compresses it to generate a compressed data block 124 and then transmits it to the protocol layer 106. For the data block that has been compressed at the protocol layer 108 of the server 104, the client 102, after receiving the data block, will decompress it at the protocol layer 106 to obtain the requested data block.

Figure 2:
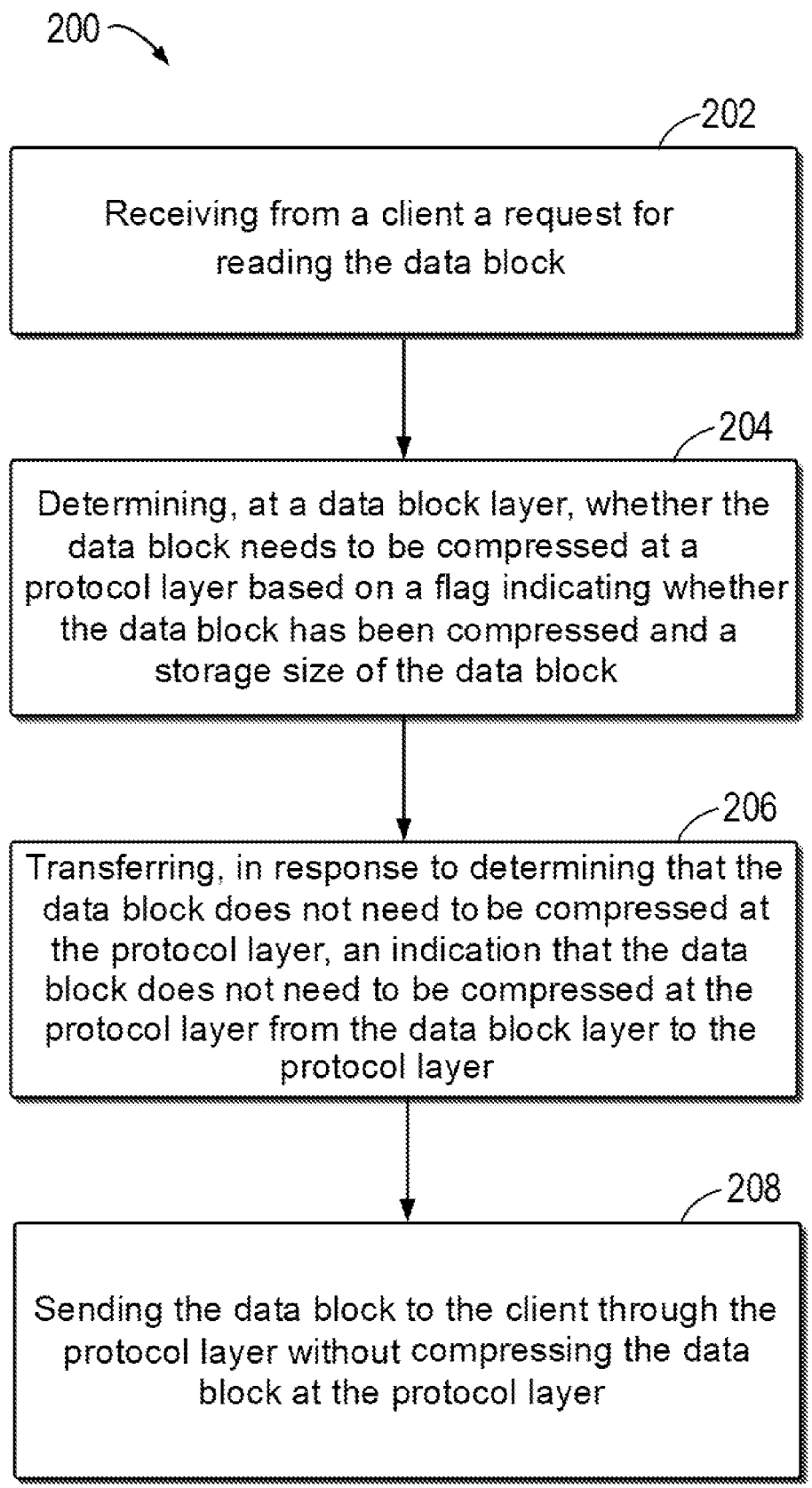
FIG. 2 illustrates a flow chart of a method for transmitting a data block according to some embodiments of the present disclosure.

FIG. 2 illustrates a flow chart of a method 200 for transmitting a data block according to some embodiments of the present disclosure. As shown in FIG. 2, at block 202, the method 200 receives a request from a client for reading the data block. For example, in the environment 100 shown in FIG. 1, the server 104 may receive the read request 120 from the client 102 for reading the data block, wherein the data block to be read may be one or more of the data blocks 114.

At block 204, the method 200 may determine (or ascertain), at a data block layer, whether the data block needs to be compressed at a protocol layer based on a flag indicating whether the data block has been compressed and a storage size of the data block. For example, in the environment 100 shown in FIG. 1, the server 104 includes the protocol layer 108, the file system layer 110, and the data block layer 112, wherein the compression information for the data block 114 may be acquired at the data block layer 112. The compression information may include a compression flag indicating whether the data block stored in the disk has been compressed (e.g., the compression flag 116 indicating whether the data block 114-1 has been compressed and stored) and a storage size indicating the space the data block actually occupies in the disk (e.g., the storage size 118 indicating the space the data block 114-1 actually occupies in the disk). At the time the read request 120 requests reading of the data block 114-1, the server 104 may determine whether the data block 114-1 needs to be compressed at the protocol layer based on the compression flag 116 and the storage size 118.

At block 206, the method 200 transfers, in response to determining (or detecting) that the data block does not need to be compressed at the protocol layer, an indication that the data block does not need to be compressed at the protocol layer from the data block layer to the protocol layer. For example, in the environment 100 shown in FIG. 1, if it is determined that the data block 114-1 does not need to be compressed at the protocol layer, the compression indication 122 indicating that the data block 114-1 does not need to be compressed may be transferred from the data block layer to the protocol layer 108 via the file system layer 110. In some embodiments, the compression indication 122 may be a flag in a data structure corresponding to the data block 114-1, which is transferred together with the data block 114-1 to the protocol layer.

At block 208, the method 200 sends the data block to the client through the protocol layer without compressing the data block at the protocol layer. For example, in the environment 100 shown in FIG. 1, at the protocol layer 108, the data block 114-1 (i.e., the uncompressed data block 126) may be sent to the client 102 according to the compression indication 122 indicating that the data block 114-1 does not need to be compressed, without being compressed at the protocol layer. In some embodiments, if the compression indication 122 indicates that the data block 114-1 needs to be compressed at the protocol layer, the protocol layer 108 will compress the data block 114-1 and then send the compressed data block 124 to the client 102, and the client 102 will then decompress the compressed data block 124 at the protocol layer 106 to obtain the data block 114-1.

In this way, by transferring the compressibility information for data blocks from the data block layer to the protocol layer, the protocol layer can be enabled to perform appropriate operation processes for different data blocks, so that compression and decompression operations for data blocks with poor compressibility can be reduced, thus saving processor and memory resources. In addition to this, since this approach reduces the number of compression and decompression operations, thereby saving the time consumed in performing the compression and decompression operations, the overall response time can be reduced.

In conventional solutions, it is not possible to perform appropriate operations for different data blocks because the compression information for the data blocks cannot be learnt at the protocol layer. In embodiments provided in the present disclosure, compression information for the data block may be generated at the data block layer, and an evaluation may be performed at the data block layer based on the compression information for the data block for which the client requests reading so as to evaluate whether this data block needs to be compressed at the protocol layer, and then an indication indicating whether compression is needed may be transferred from the data block layer to the protocol layer.

In order to generate and store compression information for the data block, in some embodiments, before the data block is written to the disk, upon receipt of the original data block to be written (also referred to as a first data block), a compressed data block (also referred to as a second data block) may be generated by compressing the original data block. Then, a size of the original data block and a size of the compressed data block may be determined, and the compressed data block is stored if a ratio of the size of the original data block to the size of the compressed data block is greater than or equal to a predetermined threshold. A flag corresponding to the original data block that indicates whether the original data block has been compressed may then be set to a value indicating that the original data block has been compressed, and the size of the compressed data block may be recorded. In some embodiments, if the ratio of the size of the original data block to the size of the compressed data block is less than the predetermined threshold, the original data block is stored. A flag corresponding to the original data block that indicates whether the original data block has been compressed may then be set to a value indicating that the original data block has not been compressed.

Figure 3:
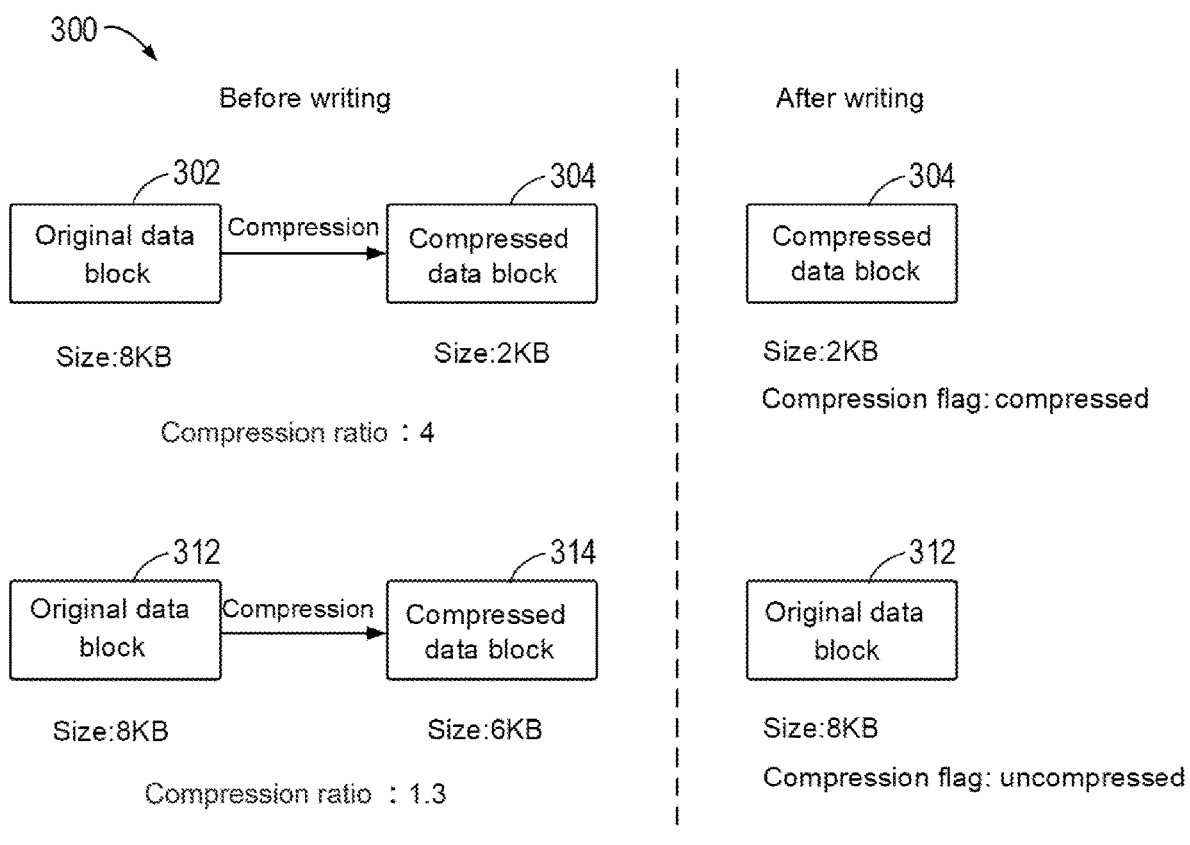
FIG. 3 illustrates a schematic diagram of a process for generating compression information for the data block according to some embodiments of the present disclosure.

FIG. 3 illustrates a schematic diagram of an example process 300 for generating compression information for the data block according to some embodiments of the present disclosure. In the example shown in FIG. 3, the process 300 receives original data blocks 302 and 312. In a storage server (e.g., the server 104 shown in FIG. 1), the file may be stored in the disk in the form of data blocks, and the size of the data blocks may be specified in a configurable manner. For example, each data block may be of 4 KB, 8 KB, 16 KB, 1 MB, and so forth. In this example, the size of the data blocks is configured to be 8 KB, so that the original data blocks 302 and 312 are both 8 KB in size. Before writing the original data blocks 302 and 312 to the disk, the process 300 may use a compression algorithm that has stronger performance than the one that is used at the protocol layer to compress the original data block 302 to generate the compressed data block 304 and to compress the original data block 312 to generate the compressed data block 314. In the example illustrated in FIG. 3, the size of the compressed data block 304 is 2 KB, and the size of the compressed data block 314 is 6 KB.

The process 300 may then determine (e.g., generate or derive) a compression ratio of the original data block 302 by calculating a ratio of the size of the original data block 302 to the size of the compressed data block 304, and determine a compression ratio of the original data block 312 by calculating a ratio of the size of the original data block 312 to the size of the compressed data block 314. In the example shown in FIG. 3, the compression ratio of the original data block 302 is 4 (i.e., 8 KB/2 KB), and the compression ratio of the original data block 312 is approximately 1.3 (i.e., 8 KB/6 KB).

When writing a data block, the process 300 may compare the compression ratio with a predetermined threshold ratio. In the example shown in FIG. 3, the threshold ratio is set to 2, then the compression ratio (i.e., 4) of the original data block 302 is greater than the threshold ratio (i.e., 2), which indicates that the original data block 302 has good compressibility, and thus storing the compressed data block 304 can save a high amount of disk space, which is worthwhile, although processor and memory resources and time costs are required to decompress this data block when it is read in the future. Therefore, the process 300 may write the compressed data block 304 to the disk and set the compression flag corresponding thereto to a value indicating that the compressed data block 304 being written is a data block that has been compressed (e.g., "compressed" or "1"), and record the size (i.e., 2 KB) of the compressed data block 304.

In contrast, the compression ratio (i.e., 1.3) of the original data block 312 is less than the threshold ratio (i.e., 2), which indicates that the original data block 312 has poor compressibility, and thus if the compressed data block 314 is stored, only a small amount of disk space can be saved, which, however, requires processor and memory resources and time costs to decompress it in the future and is not worthwhile. Therefore, in this case, the process 300 may write the original data block 312 to the disk and set the compression flag corresponding thereto to a value indicating that the original data block 312 being written is an uncompressed data block (e.g., "uncompressed" or "0"), and since the size of the original data block 312 is set to 8 KB, there is no need to additionally record the amount of disk space it actually occupies.

In this way, some data blocks with poor compressibility can be marked when they are written to the disk, and if the compression algorithm used by the storage server when writing the data block fails to compress it effectively, the more lightweight compression algorithm with weaker performance at the protocol layer cannot compress it effectively either; therefore, when the client needs to read this data block, it can be directly determined that it does not need to be compressed at the protocol layer, thus saving computation time and improving computation efficiency. In addition to this, for data blocks with good compressibility, since the process 300 has recorded the storage size of the compressed data block when writing the compressed data block to the disk, when determining whether it needs to be compressed at the protocol layer, the storage size can be used directly to calculate the compression ratio without having to perform the compression operation, which can save the computation time, improve the computation efficiency, and reduce the consumption of processor resources and memory resources.

Figure 4:
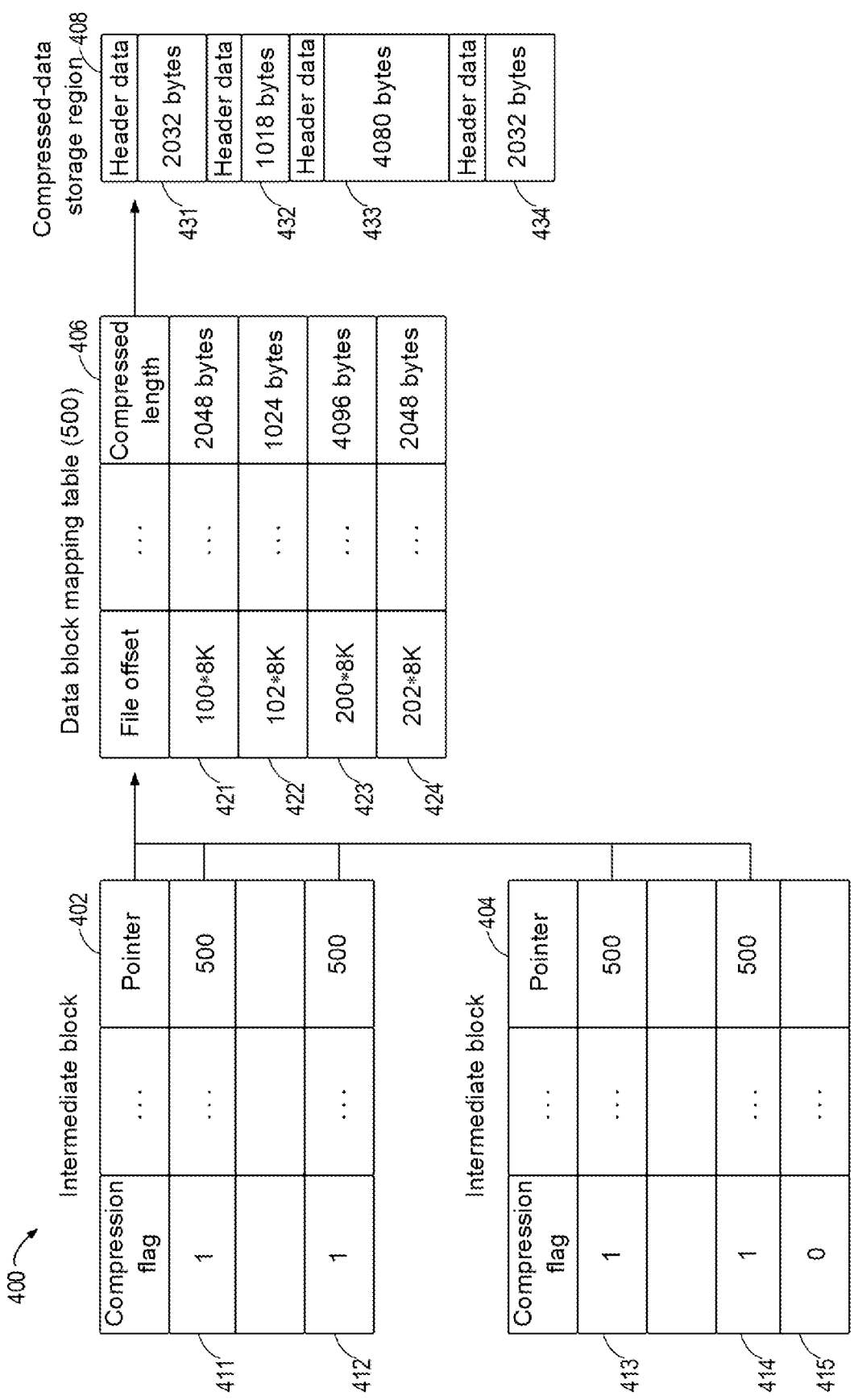
FIG. 4 illustrates a schematic diagram of an example of storing the compression information for the data block according to some embodiments of the present disclosure.

In order to store the compression information for the data block, in some embodiments, an intermediate block may be used to store the compression flag, and a data block mapping table may be used to store the size of the compressed data block. FIG. 4 illustrates a schematic diagram of an example 400 of storing the compression information for the data block according to some embodiments of the present disclosure. As shown in FIG. 4, the example 400 includes an intermediate block 402, an intermediate block 404, a data block mapping table 406, and a compressed-data storage region 408. In some embodiments, the storage structure of the disk may be a tree structure (e.g., a B-tree and variants of a B-tree, an LSM tree, etc.), and the intermediate blocks 402 and 404 may be leaf intermediate blocks in the tree structure. As shown in FIG. 4, the intermediate blocks 402 and 404 each include a compression flag field and a pointer field, and each entry in the intermediate blocks 402 and 404 corresponds to one data block. The compression flag field indicates whether the data block written to the disk has been compressed, and in the example 400, entries 411, 412, 413, and 414 have a value of "1" in the compression flag field, which indicates that the data blocks corresponding to those entries have been compressed. Corresponding entries in the data block mapping table can be found according to the pointer fields of these entries. For example, in the example 100, the pointers of the entries 411, 412, 413, and 414 all point to the data block mapping table 406.

The data block mapping table is used to track mapping relationships between various kinds of data in the storage server, and it includes information associated with compressed data blocks. In the example 400, the data block mapping table 406 includes an entry 421 corresponding to the entry 411, an entry 422 corresponding to the entry 412, an entry 423 corresponding to the entry 413, and an entry 414 corresponding to the entry 414. The entry 421 includes a compressed-length field, which represents the address length of the compressed data block in the storage space, and may also represent the actual storage size of the compressed data block. For example, the compression flag of the entry 411 in the intermediate block 402 is "1," and the entry 421 in the data block mapping table 406 corresponding to the entry 411 has a compressed length of 2048 bytes, which may indicate that the data blocks corresponding to the entries 411 and 421 are stored in the disk after being compressed, and that the compressed data block has a storage size of 2048 bytes (i.e., 2 KB).

The data block mapping table 406 may be associated with the compressed-data storage region 408, and the compressed data blocks are stored in the compressed-data storage region 408. The compressed-data storage region 408 includes compressed data 431, 432, 433, and 434, and each of the compressed data has corresponding header data, wherein the header data stores the address length of the storage space occupied by the compressed data, and the compressed length of the data block mapping table 406 includes the address length of the space occupied by the compressed data in the compressed-data storage region and the address length of the space occupied by the corresponding header data. In some embodiments, the compressed length in the data block mapping table 406 may be used as the storage size of the compressed data block, and in some other embodiments, the address length of the space occupied by the compressed data (e.g., the compressed data 431) in the compressed-data storage region 408 may be used as the storage size of the compressed data block.

In this way, the compression information such as the compression flag and the storage size of the data block can be stored effectively, so as to prepare for the subsequent determination of whether this data block needs to be compressed at the protocol layer, thus saving the computation time and improving the computation efficiency.

Figure 5:
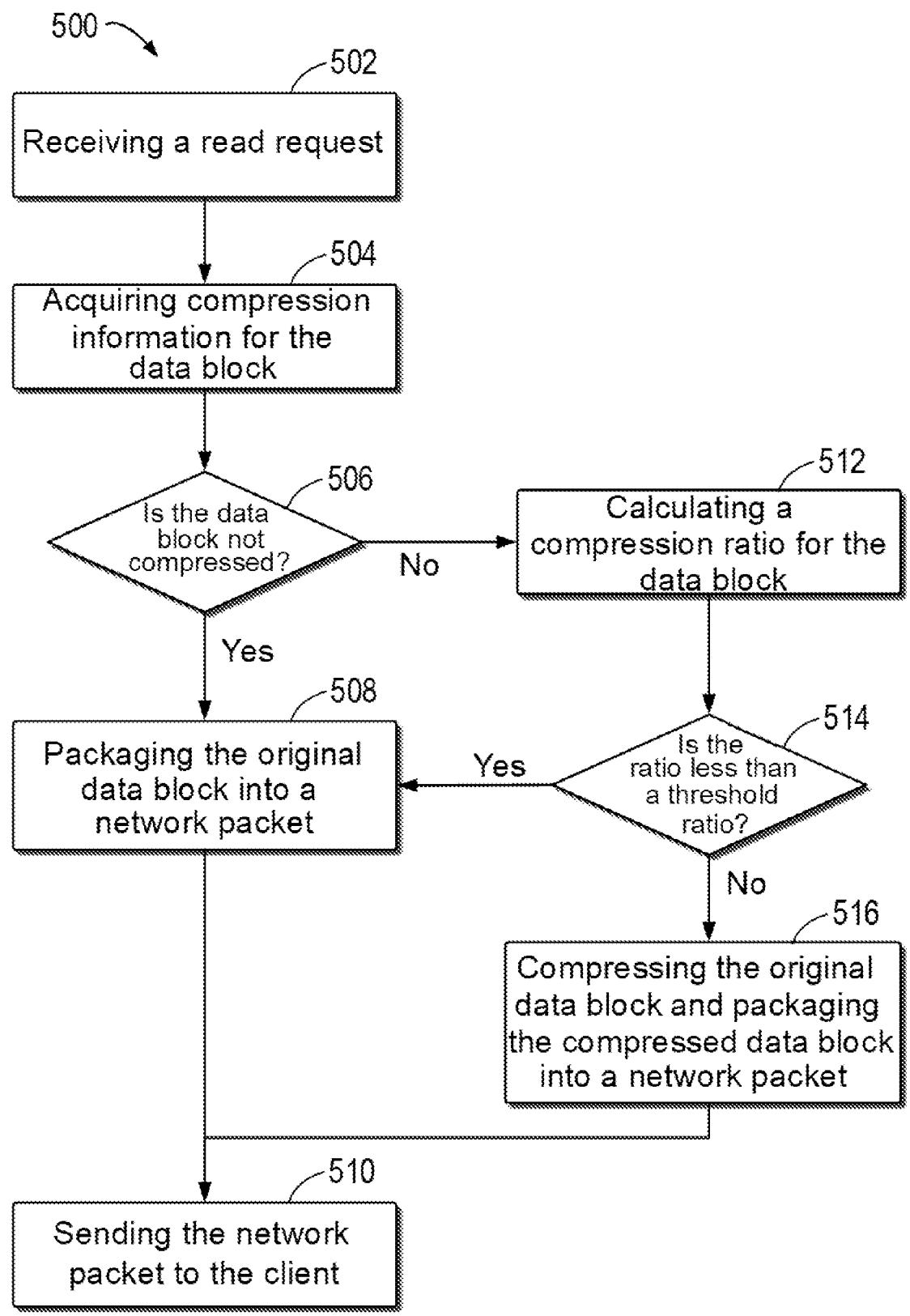
FIG. 5 illustrates a schematic diagram of an example process from receiving a request for reading the data block to sending the data block according to some embodiments of the present disclosure.

FIG. 5 illustrates a schematic diagram of an example process 500 from receiving a request for reading the data block to sending the data block according to some embodiments of the present disclosure. As shown in FIG. 5, at block 502, the process 500 receives a request from a client for reading the data block. For example, in the environment 100 shown in FIG. 1, the server 104 may receive the request 120 from the client 102 for reading the data block, wherein the data block to be read may be one or more of the data blocks 114.

At block 504, the process 500 acquires, at the data block layer, compression information associated with the data block requested to be read, wherein the compression information includes a compression flag indicating whether the data block has been compressed and a storage size of the data block For example, in the environment 100 shown in FIG. 1, the read request 120 may be a read request for the data block 114-1, then the process 500 may acquire the compression flag 116 and the storage size 118 of the data block 114-1 at the data block layer 112. The compression flag 116 may be acquired from, for example, the intermediate block 402 or 404 shown in FIG. 4. If the value of the compression flag 116 is "1," it means that the data block 114-1 was already compressed when it was written to disk. In this case, the storage size 118 may be acquired from, for example, the compressed-length field of the data block mapping table 406 shown in FIG. 4, and the storage size 118 may be indicative of the size (e.g., 2 KB) of the compressed data block 114-1. If the value of the compression flag 116 is "0," it means that the data block 114-1 was written as an uncompressed original data block when it was written to the disk. In this case, the configuration (e.g., 8 KB) of the server for the original data block size may be acquired as the storage size 118.

At block 506, the process 500 determines (or senses/discovers) at the data block layer whether the data block has been compressed, and if a compression flag for the data block indicates that the data block is not compressed (e.g., the value of the compression flag is "0"), which indicates that the data block has poor compressibility, then the process 500 may transfer an indication that compression is not needed for this data block from the data block layer to the protocol layer, and then the process 500 proceeds to block 508. At block 508, the process 500 receives at the protocol layer the indication that compression is not needed for this data block, and therefore packages the original data block into a network packet. For example, in the environment 100 shown in FIG. 1, the process 500 receives at the protocol layer 108 the compression indication 122 indicating that compression is not needed for the data block 114-1, then packages the uncompressed data block 114-1 directly into a network packet at the protocol layer 108 without the need for compression of the data block. At block 510, the process 500 sends this network packet to the client requesting reading of the data block.

Returning to block 506, if the process 500 determines that the compression flag of the data indicates that the data block has been compressed (e.g., the value of the compression flag is "1"), which indicates that the data block may have good compressibility, but further determination of its compressibility is still needed, the process 500 proceeds to block 512. At block 512, the process 500 calculates a compression ratio for the data block at the data block layer based on the storage size of that data block and the size of the original data block configured by the storage server. For example, in the example shown in FIG. 4, a data block in the data block mapping table 406 that corresponds to the entry 421 has an original data block size of 8 KB and a compressed length (i.e., a storage size) of 2 KB, then a compression ratio of 4 (i.e., 8 KB/2 KB) may be determined by calculating a ratio of the original data block size to the compressed length.

At block 514, the process 500 may compare the compression ratio of the data block to a predetermined threshold compression ratio, and if the compression ratio of the data block is less than the threshold ratio, the process 500 proceeds to block 508. For example, if the predetermined threshold ratio is 3 and the compression ratio of the data block is 2, which indicates that the compressibility of the data block still does not meet the requirements, the process 500 may transfer the indication that the data block does not need to be compressed from the data block layer to the protocol layer, and then the process 500 proceeds to block 508. If the compression ratio of the data block is greater than or equal to the threshold ratio, the process proceeds to block 516. For example, if the predetermined threshold ratio is 3 and the compression ratio of the data block is 4, which indicates that this data block has good compressibility, the process 500 proceeds to block 516.

At block 516, the process 500 compresses the original data block at the protocol layer and packages the compressed data block into a network packet. For example, in the environment 100 shown in FIG. 1, the process 500 may compress the uncompressed data block 114-1 at the protocol layer 108 to generate the compressed data block 124, and then package the compressed data block 124 into a network packet. The process 500 then proceeds to block 510 and, at block 510, sends the network packet including the compressed data block to the client.

In this way, by transferring the compressibility information for data blocks from the data block layer to the protocol layer, the protocol layer can be enabled to perform appropriate operation processes for different data blocks, so that compression and decompression operations for data blocks with poor compressibility can be reduced, thus saving processor and memory resources. In addition to this, since this approach reduces the number of compression and decompression operations, thereby saving the time consumed in performing the compression and decompression operations, the overall response time can be reduced.

Figure 6:
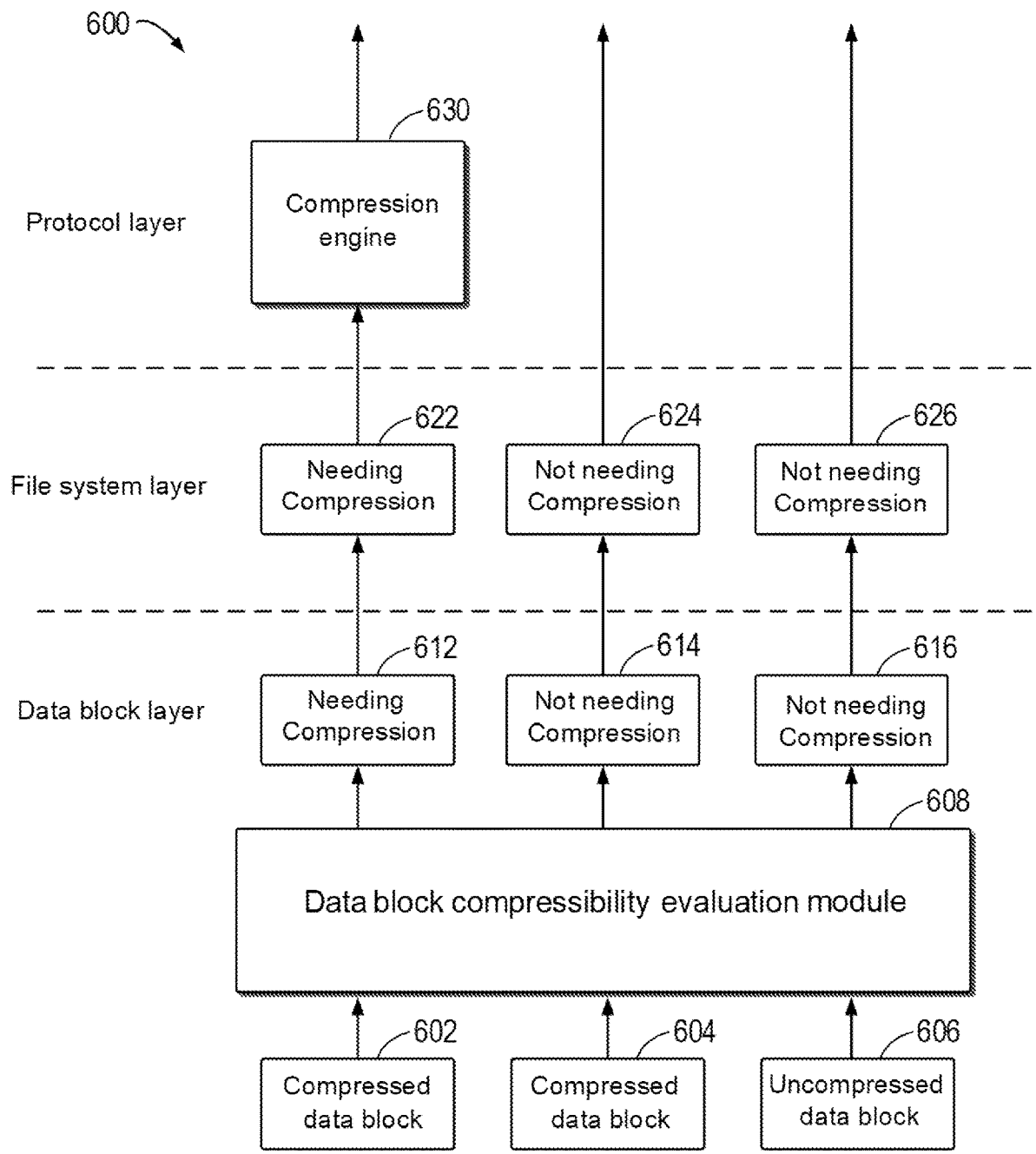
FIG. 6 illustrates a schematic diagram of an example process for transferring a compression indication from a data block layer to a protocol layer according to some embodiments of the present disclosure.

In order to transfer the indication that the data block does not need to be compressed from the data block layer to the protocol layer, in some embodiments, the indication may be transferred from the data block layer to the file system layer, and then from the file system layer to the data block layer. In some embodiments, the compression indication may be set into the requested data block and transferred from the data block layer to the protocol layer along with the data block via the input/output (I/O) stack. In some embodiments, since the compression indication has only two states (i.e., needing compression and not needing compression), it is possible to transfer only the indication of not needing compression, and if the indication that compression of the data block is not necessary is not received at the protocol layer, the data block is compressed at the protocol layer. FIG. 6 illustrates a schematic diagram of an example process 600 for transferring a compression indication from a data block layer to a protocol layer according to some embodiments of the present disclosure. As shown in FIG. 6, the process 600 needs to transfer data blocks 602, 604, and 606 from the data block layer along the I/O stack to the protocol layer, and then send them at the protocol layer to the client, where the data blocks 602 and 604 are compressed data blocks (i.e., the compression flag is, for example, "1"), and the data block 606 is an uncompressed data block (i.e., the compression flag is, for example, "0").

As shown in FIG. 6, the process 600 uses a data block compressibility evaluation module 608 at the data block layer to evaluate whether the data blocks 602, 604, and 606 need to be compressed. In the example shown in FIG. 6, the data block compressibility evaluation module 608 determines that the compression ratio of the data block 602 is greater than or equal to the predetermined threshold ratio (e.g., the original data block size of the data block 602 is 8 KB, and the compressed storage size is 2 KB, which result in a compression ratio of 4, while the predetermined threshold ratio is 3), which indicates that it has good compressibility, and thus the data block 602 may be marked as requiring compression (or the data block may not be marked, and if the data block is not marked as not needing compression, this means that it needs compression) and a data block 612 may be generated. The process 600 may then transfer the data block 612 to the file system layer, and convert at the file system layer the data block 612 into a data block 622 that can be used by the protocol layer. The process 600 may then transfer the data block 622 to the protocol layer. At the protocol layer, the process 600 determines that the data block 622 needs to be compressed, so that a compression engine 630 can be used to compress the data block 622 and then send the compressed data block to the client.

In addition, the process 600 may also use the data block compressibility evaluation module 608 to determine that the compression ratio of the data block 604 is less than the predetermined threshold (e.g., the original data block size of the data block 604 is 8 KB and the compressed storage size is 4 KB, which result in a compression ratio of 2, while the predetermined threshold ratio is 3), which indicates that its compressibility is poor, and thus the data block 604 may be marked as not needing compression and a data block 614 is generated. The process 600 may then transfer the data block 614 to the file system layer, and convert at the file system layer the data block 614 into a data block 624 that can be used by the protocol layer. The process 600 may then transfer the data block 624 to the protocol layer. At the protocol layer, the process 600 determines that the data block 624 does not need to be compressed, and therefore the data block 624 can be sent directly to the client without the need to use the compression engine 630 to compress it.

Additionally, the process 600 may also use the data block compressibility evaluation module 608 to determine that the data block 606 is an uncompressed data block, which indicates that it was determined to have poor compressibility at the time it was written to the disk, and therefore the data block 606 may be marked as not needing compression and a data block 616 may be generated. The process 600 may then transfer the data block 616 to the file system layer, and convert at the file system layer the data block 616 into a data block 626 that can be used by the protocol layer. The process 600 may then transfer the data block 626 to the protocol layer. At the protocol layer, the process 600 determines that the data block 626 does not need to be compressed, and therefore the data block 626 can be sent directly to the client without the need to use the compression engine 630 to compress it.

It should be noted that although only the data block layer, the file system layer, and the protocol layer are illustrated in the example shown in FIG. 6, it is not intended to limit the specific implementation to include only three layers from the data block layer to the protocol layer. In contrast, in specific implementations, the data block layer, the file system layer, and the protocol layer can often be internally divided into multiple layers; however, regardless of the specific implementation, a requested data block is always transferred from the bottom layer in the data block layer into the protocol layer in a layer by layer fashion, and thus a compression indication may also be transferred from the bottom layer of the data block layer into the protocol layer along with the data block in a layer by layer fashion, and in each layer, the data block and the compression indication are both converted into formats that can be used at the next layer.

In this way, it can be evaluated, at the data block layer based on compression information that is not available at the protocol layer, whether the requested data block needs to be compressed at the protocol layer, and an indication that it does not need to be compressed can be transferred from the data block layer to the protocol layer in a layer by layer fashion to enable the protocol layer to perform appropriate operations for data blocks having different compressibility, so that compression and decompression operations on data blocks with poor compressibility can be reduced, thus saving processor and memory resources. In addition to this, since this approach reduces the number of compression and decompression operations, thereby saving the time consumed in performing the compression and decompression operations, the overall response time can be reduced.

Figure 7:
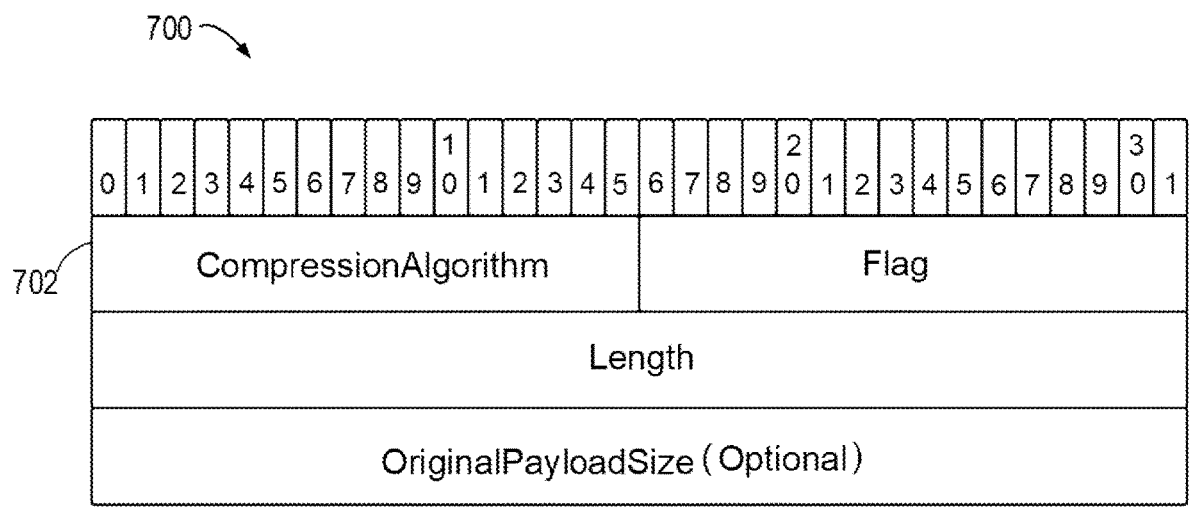
FIG. 7 illustrates a schematic diagram of an example header structure for use at the protocol layer according to some embodiments of the present disclosure.

In some embodiments, the protocol layer processes the data in the form of a data stream and rearranges the data block into different packets. For example, in the SMB protocol, the client or server may use a COMPRESSION_PAYLOAD_HEADER header to send a compressed payload. FIG. 7 illustrates a schematic diagram of an example header structure 700 for use at the protocol layer according to some embodiments of the present disclosure. As shown in FIG. 7, the header structure 700 includes a CompressionAlgorithm field 702, which is 16 bits in length, with different values indicating the use of different compression algorithms for protocol layer compression of the data block. For example, the SMB compression supports XPRESS (LZ77), XPRESS Huffman (LZ77+Huffman), (LZNT1), and PATTERN_V1* compression algorithms, and the SMB protocol automatically uses the XPRESS compression algorithm for protocol layer compression. When the value of the CompressionAlgorithm field 702 is "0x0000" (i.e., indicating "None" or indicating that no compression algorithm is specified), the protocol layer sends the original data block without compressing it. Therefore, for data blocks for which protocol layer compression does not need to be performed, the CompressionAlgorithm field 702 in the header structure 700 can be set to "0x0000."

Figure 8:
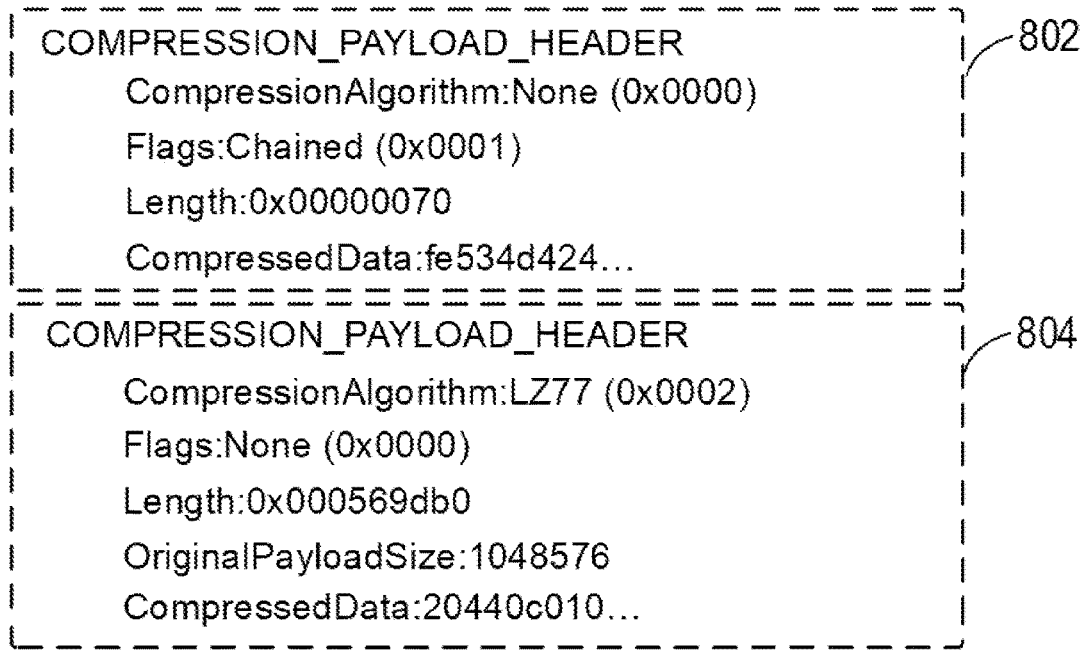
FIG. 8 illustrates a schematic diagram of an example in which a plurality of payload headers are included in a single network packet according to some embodiments of the present disclosure.

With the header structure 700 as shown in FIG. 7, in some embodiments, a plurality of payload headers may be applied when splitting or merging data blocks into SMB data packets. FIG. 8 illustrates a schematic diagram of an example 800 in which a plurality of payload headers are included in a single network packet according to some embodiments of the present disclosure. As shown in FIG. 8, the example 800 includes headers 802 and 804, where in the header 802, the value of the CompressionAlgorithm field is "0x0000" (i.e., indicating "None," or indicating that no compression algorithm is specified), which indicates that the data block does not need to be compressed at the protocol layer, and the original data block is sent directly to the client. In the header 804, the CompressionAlgorithm field has a value of "0x0002" (i.e., indicating the LZ77 compression algorithm), which indicates that the LZ77 compression algorithm needs to be used at the protocol layer to compress the data block before sending it to the client.

In this way, the compression information for the requested data block can be collected at the data block layer and transferred to the protocol layer. The protocol layer compression will use such knowledge to select whether the requested data block needs to be compressed.

Figure 9:
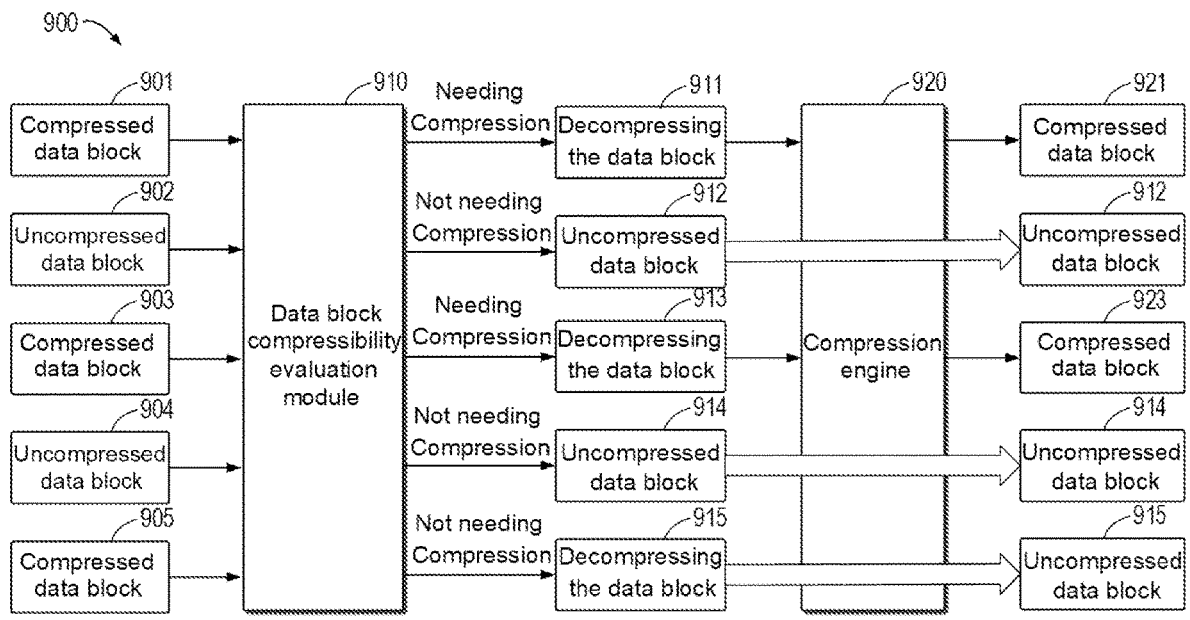
FIG. 9 illustrates another schematic diagram of an example process for transferring a compression indication from a data block layer to a protocol layer according to some embodiments of the present disclosure.

FIG. 9 illustrates another schematic diagram of an example process 900 for transferring a compression indication from a data block layer to a protocol layer according to some embodiments of the present disclosure. As shown in FIG. 9, the process 900 needs to send data blocks 901, 902, 903, 904, and 905 to the client. The process 900 may use a data block compressibility evaluation module 910 (e.g., the data block compressibility evaluation module 608 in FIG. 6) to evaluate the compressibility of these data blocks. In the example shown in FIG. 9, data blocks 902 and 904 store uncompressed original data blocks in the disk, which indicates that they have poor compressibility, so the process 900 may mark them at the data block layer as not needing compression and generate data blocks 912 and 914. Data blocks 901, 903, and 905 store compressed data blocks in the disk, and after the evaluation by the data block compressibility evaluation module 910, the compression ratio of the data block 905 is less than the predetermined threshold ratio, which indicates that the compressibility of the data block does not satisfy the requirements either; therefore, the process 900 may decompress it at the data block layer and mark it as not needing compression, thereby generating the decompressed original data block 915. In the example shown in FIG. 9, for data blocks 901 and 903, after the evaluation by the data block compressibility evaluation module 910, the compression ratio of the data block 905 is greater than or equal to the predetermined threshold, which indicates that the data block has good compressibility; therefore, the process 900 may decompress it at the data block layer and mark it as needing compression (or not mark it, but compress it by default at the protocol layer), thereby generating decompressed original data blocks 911 and 913.

After obtaining the data blocks 911, 912, 913, 914, and 915, the process 900 compresses the data blocks 911 and 913 that need protocol layer compression at the protocol layer based on the compression flags and using a compression engine 920 (e.g., the compression engine 630 in FIG. 6) so as to generate the compressed data blocks 921 and 923, and send them to the client. In addition, since the data blocks 912, 914, and 915 are labeled as not needing protocol layer compression, the process 900 can bypass the compression engine 920 and send them directly to the client without the need for protocol layer compression on them.

In this way, compression and decompression operations on data blocks with poor compressibility can be reduced, thus saving processor and memory resources. In addition to this, since this approach reduces the number of compression and decompression operations, thereby saving the time consumed in performing the compression and decompression operations, the overall response time can be reduced.

Figure 10:
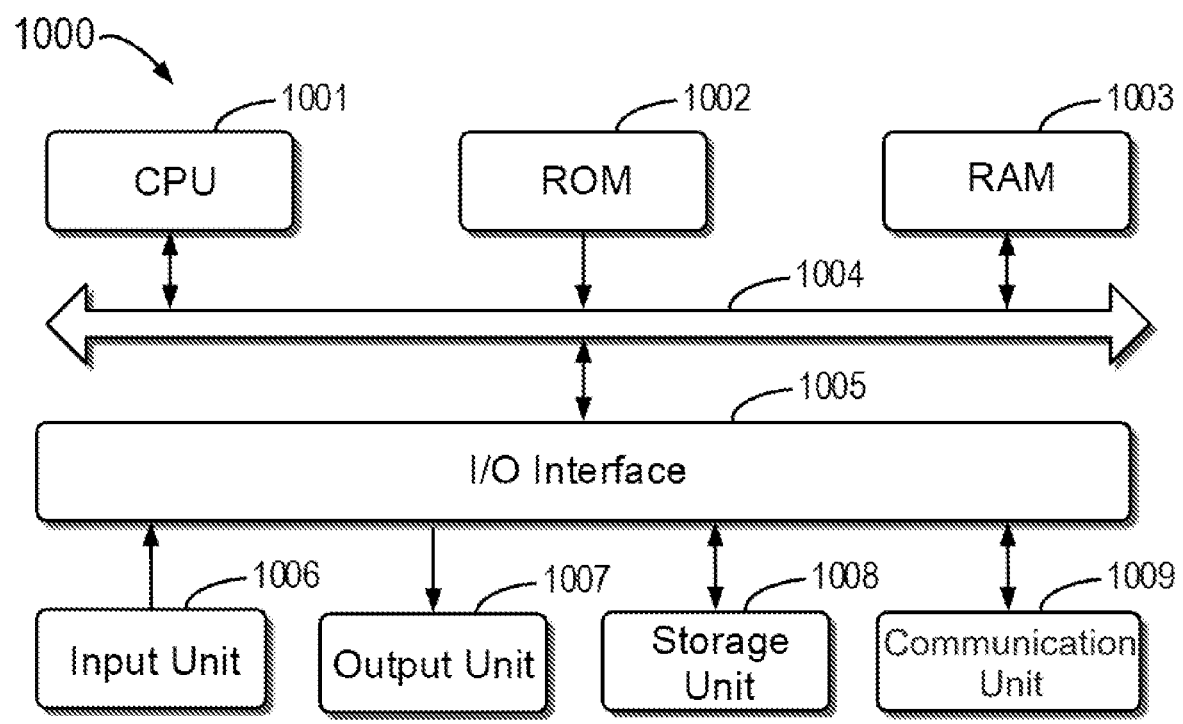
FIG. 10 illustrates a block diagram of a device that can implement a plurality of embodiments of the present disclosure.

FIG. 10 illustrates a schematic block diagram of an example device 1000 that can be used to implement embodiments of the present disclosure. As illustrated in the figure, the device 1000 includes a computing unit 1001 that can execute various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The computing unit 1001, the ROM 1002, and the RAM 1003 are connected to each other through a bus 1004. An input/Output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; a storage unit 1008, e.g., a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The computing unit 1001 may be various general-purpose and/or special-purpose processing components with processing and computing capabilities. Some examples of computing units 1001 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 1001 performs various methods and processing described above, such as the method 200. For example, in some embodiments, the method 200 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded to the RAM 1003 and executed by the computing unit 1001, one or more steps of the method 200 described above may be performed. Alternatively, in other embodiments, the computing unit 1001 may be configured to implement the method 200 in any other suitable manners (such as by means of firmware).

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter recited in the appended claims is not necessarily limited to the particular features or actions described above. Rather, the specific features and actions described above are merely example forms of implementing and/or supporting the claims.

The invention claimed is:

1. A method for transmitting a data block, comprising:
   receiving, from a client, a request for reading the data block;
   determining, at a data block layer, whether the data block needs to be compressed at a protocol layer based on a flag indicating whether the data block has been compressed and a storage size of the data block;
   transferring, in response to determining that the data block does not need to be compressed at the protocol layer, an indication that the data block does not need to be compressed at the protocol layer from the data block layer to the protocol layer; and
   sending the data block to the client through the protocol layer without compressing the data block at the protocol layer;
   wherein transferring the indication that the data block does not need to be compressed at the protocol layer from the data block layer to the protocol layer comprises:
   transferring the indication from the data block layer to a file system layer; and
   transferring the indication from the file system layer to the protocol layer.

2. The method according to claim 1, further comprising:
   generating, in response to receiving a first data block, a second data block by compressing the first data block;
   determining a size of the first data block and a size of the second data block; and
   storing the second data block in response to a ratio of the size of the first data block to the size of the second data block being greater than or equal to a predetermined threshold.

3. The method according to claim 2, further comprising:
   setting a flag corresponding to the first data block that indicates whether the first data block has been compressed to a first value, the first value indicating that the first data block has been compressed; and
   recording the size of the second data block.

4. The method according to claim 2, further comprising:
   storing the first data block in response to the ratio of the size of the first data block to the size of the second data block being less than the predetermined threshold.

5. The method according to claim 4, further comprising:
   setting a flag corresponding to the first data block that indicates whether the first data block has been compressed to a second value, the second value indicating that the first data block has not been compressed.

6. The method according to claim 1, wherein the flag indicating whether the data block has currently been compressed is stored in an intermediate block associated with the data block.

7. The method according to claim 1, wherein determining, at the data block layer, whether the data block needs to be compressed at the protocol layer comprises:
   determining, at the data block layer, that the data block has been compressed based on the flag indicating whether the data block has currently been compressed;
   determining a compression ratio of the data block based on the storage size of the data block and an original size of the data block before being compressed; and
   determining that the data block does not need to be compressed at the protocol layer by determining that the compression ratio of the data block is less than a predetermined threshold.

8. The method according to claim 7, wherein sending the data block to the client through the protocol layer comprises:
   obtaining an original data block by decompressing the data block; and
   sending the original data block.

9. The method according to claim 1, wherein determining, at the data block layer, whether the data block needs to be compressed at the protocol layer further comprises:
   determining that the data block has not been compressed based on the flag indicating whether the data block has currently been compressed; and
   determining that the data block does not need to be compressed at the protocol layer by determining that the data block has not been compressed.

10. An electronic device, comprising:
    at least one processor; and
    a memory coupled to the at least one processor and having instructions stored thereon, wherein the instructions, when executed by the at least one processor, cause the electronic device to perform actions comprising:
    receiving, from a client, a request for reading a data block;
    determining, at a data block layer, whether the data block needs to be compressed at a protocol layer based on a flag indicating whether the data block has been compressed and a storage size of the data block;
    transferring, in response to determining that the data block does not need to be compressed at the protocol layer, an indication that the data block does not need to be compressed at the protocol layer from the data block layer to the protocol layer; and
    sending the data block to the client through the protocol layer without compressing the data block at the protocol layer;
    wherein transferring the indication that the data block does not need to be compressed at the protocol layer from the data block layer to the protocol layer comprises:
    transferring the indication from the data block layer to a file system layer; and
    transferring the indication from the file system layer to the protocol layer.

11. The device according to claim 10, further comprising:
    generating, in response to receiving a first data block, a second data block by compressing the first data block;
    determining a size of the first data block and a size of the second data block; and
    storing the second data block in response to a ratio of the size of the first data block to the size of the second data block being greater than or equal to a predetermined threshold.

12. The device according to claim 11, further comprising:
    setting a flag corresponding to the first data block that indicates whether the first data block has been compressed to a first value, the first value indicating that the first data block has been compressed; and
    recording the size of the second data block.

13. The device according to claim 11, further comprising:
    storing the first data block in response to the ratio of the size of the first data block to the size of the second data block being less than the predetermined threshold.

14. The device according to claim 13, further comprising:
    setting a flag corresponding to the first data block that indicates whether the first data block has been compressed to a second value, the second value indicating that the first data block has not been compressed.

15. The device according to claim 10, wherein the flag indicating whether the data block has currently been compressed is stored in an intermediate block associated with the data block.

16. The device according to claim 10, wherein determining, at the data block layer, whether the data block needs to be compressed at the protocol layer comprises:
  determining, at the data block layer, that the data block has been compressed based on the flag indicating whether the data block has currently been compressed;
  determining a compression ratio of the data block based on the storage size of the data block and an original size of the data block before being compressed; and
  determining that the data block does not need to be compressed at the protocol layer by determining that the compression ratio of the data block is less than a predetermined threshold.

17. The device according to claim 16, wherein sending the data block to the client through the protocol layer comprises:
  obtaining an original data block by decompressing the data block; and
  sending the original data block.

18. The device according to claim 10, wherein determining, at the data block layer, whether the data block needs to be compressed at the protocol layer further comprises:
  determining that the data block has not been compressed based on the flag indicating whether the data block has currently been compressed; and
  determining that the data block does not need to be compressed at the protocol layer by determining that the data block has not been compressed.

19. The device according to claim 10, wherein the actions further comprise:
  receiving, from the client, a second request for reading a second data block;
  determining, at the data block layer, whether the second data block needs to be compressed at the protocol layer based on a second flag indicating whether the second data block has been compressed and a second storage size of the second data block;
  transferring, in response to determining that the second data block needs to be compressed at the protocol layer, an indication that the second data block needs to be compressed at the protocol layer from the data block layer to the protocol layer; and
  compressing and sending the second data block to the client through the protocol layer.

20. A computer program product having a non-transitory computer readable medium which stores a set of instructions to transmit a data block; the set of instructions, when carried out by computerized circuitry, causing the computerized circuitry to perform a method of:
  receiving, from a client, a request for reading the data block;
  determining, at a data block layer, whether the data block needs to be compressed at a protocol layer based on a flag indicating whether the data block has been compressed and a storage size of the data block;
  transferring, in response to determining that the data block does not need to be compressed at the protocol layer, an indication that the data block does not need to be compressed at the protocol layer from the data block layer to the protocol layer; and
  sending the data block to the client through the protocol layer without compressing the data block at the protocol layer;
wherein transferring the indication that the data block does not need to be compressed at the protocol layer from the data block layer to the protocol layer comprises:
  transferring the indication from the data block layer to a file system layer; and
  transferring the indication from the file system layer to the protocol layer.

* * * * *